Nov. 22, 1932.  W. KNAPP  1,888,679
SAFETY DEVICE FOR CUTTING MACHINES
Filed Jan. 7, 1931   2 Sheets-Sheet 1

INVENTOR
Walter Knapp
BY
Ramsey and Kent
ATTORNEYS

Nov. 22, 1932.   W. KNAPP   1,888,679
SAFETY DEVICE FOR CUTTING MACHINES
Filed Jan. 7, 1931   2 Sheets-Sheet 2

INVENTOR
Walter Knapp
BY Ramsey and Kent
his ATTORNEYS

Patented Nov. 22, 1932

1,888,679

UNITED STATES PATENT OFFICE

WALTER KNAPP, OF LANCASTER, PENNSYLVANIA, ASSIGNOR TO DE WALT PRODUCTS CORPORATION, OF LANCASTER, PENNSYLVANIA

SAFETY DEVICE FOR CUTTING MACHINES

Application filed January 7, 1931. Serial No. 507,077.

This invention relates to a safety device for cutting machines having high speed rotary cutters, and is particularly adapted to such machines in which the cutters are mounted above the material being cut.

A principal object of the invention is to provide safety guard members to protect the entire periphery of the cutter. In the preferred form the parts are so arranged that certain of the guard parts can be readily pushed aside by the piece of work material as it is fed to the cutter, said guard parts automatically adjusting themselves to the thickness of the work material and automatically moving to outward position to cover the entire periphery of the cutter when no work material is in the machine.

The invention also provides a guard cover to prevent accidental contact with the end of the arbor carrying the rotary cutter, said cover being removable to permit access to the device for attaching the cutter to the arbor.

The safety guard is provided with a tangentially extending dust nozzle provided with an adjustable elbow for the discharge of the dust produced by the cutter.

An additional feature resides in the provision of a splitter knife which extends into the cut formed when a saw is being used, said splitter keeping the cut from contracting and binding the sides of the saw.

A further object is to provide means for preventing return movement of the work material, preferably in the form of a pivoted dog engaging the material.

Additional objects and advantages of the invention will become apparent as the description proceeds.

While a preferred form of the invention is disclosed herein for purposes of illustration, it should be understood that various changes in the structure and arrangement of parts may be made without departing from the spirit and scope of the invention as hereinafter set forth and claimed.

Figure 1:
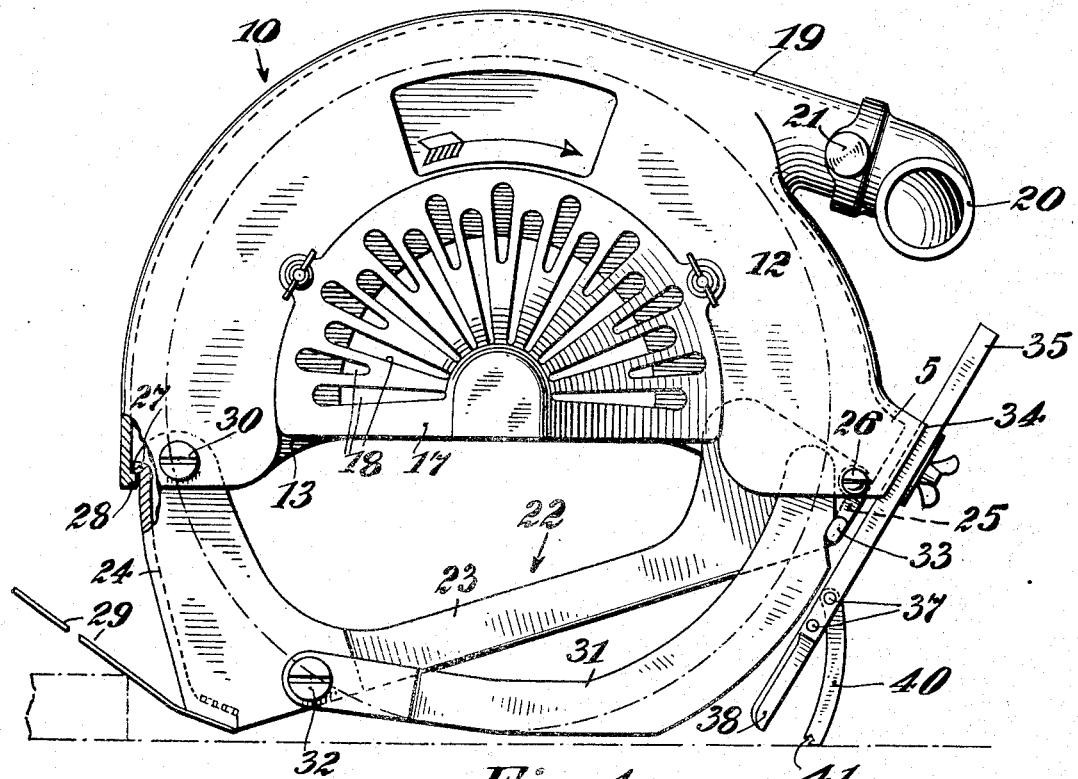
Fig. 1 is a side elevation of the safety device of the present invention showing the parts in position before a piece of work material is inserted.

Referring to the drawings more particularly, the main body part 10 is of arcuate channel shape and is attached to an adjacent machine part 11. The safety device of the present invention is particularly adapted for use with the cutting machine disclosed in De Walt Patent No. 1,738,763 and when the safety device is attached to such a machine, the part 11 is the casing for the electrical motor, which motor is adjustable about horizontal and vertical axes, as will be clear from the reference to the patent.

Figure 3:
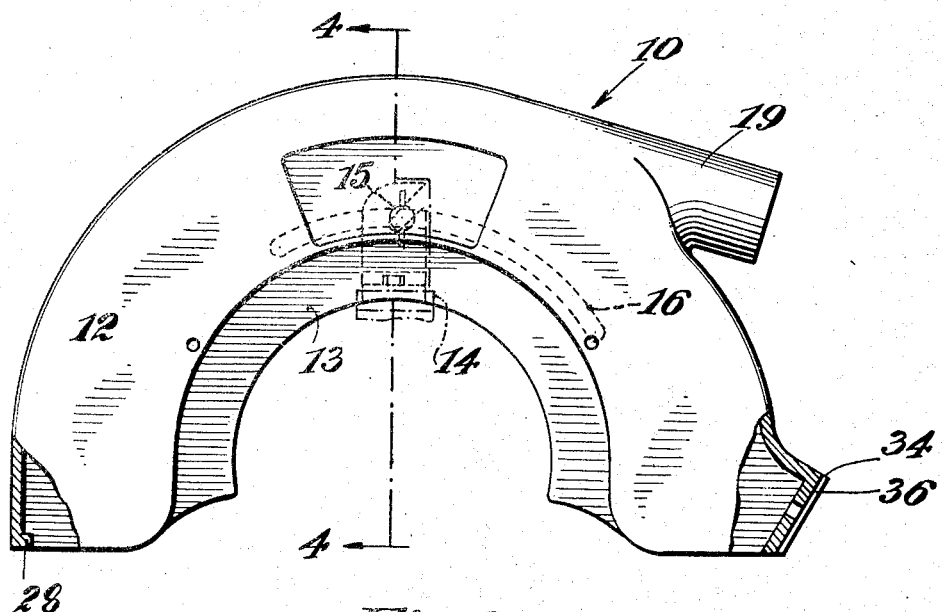
Fig. 3 is a side elevation of the main body member.
Figure 2:
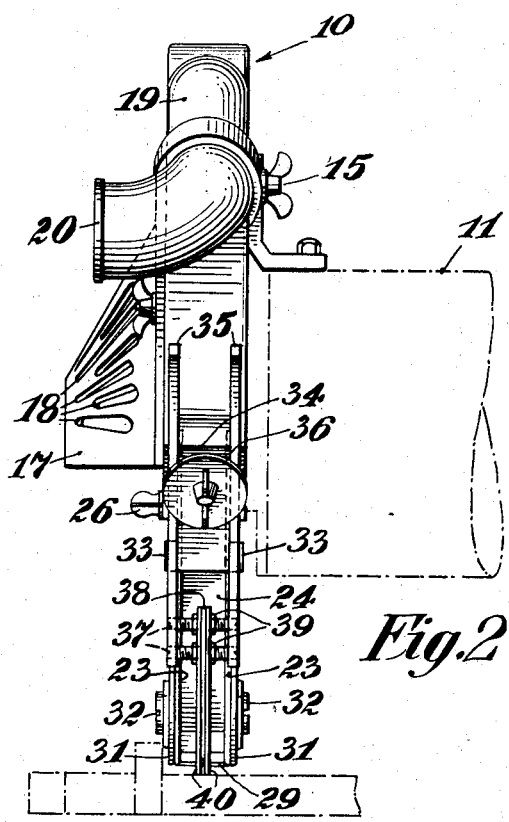
Fig. 2 is a rear elevation.
Figure 4:
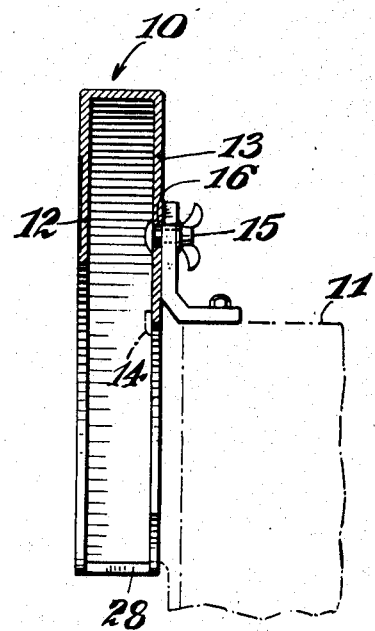
Fig. 4 is a section taken on line 4—4 of Fig. 3.
Figure 5:
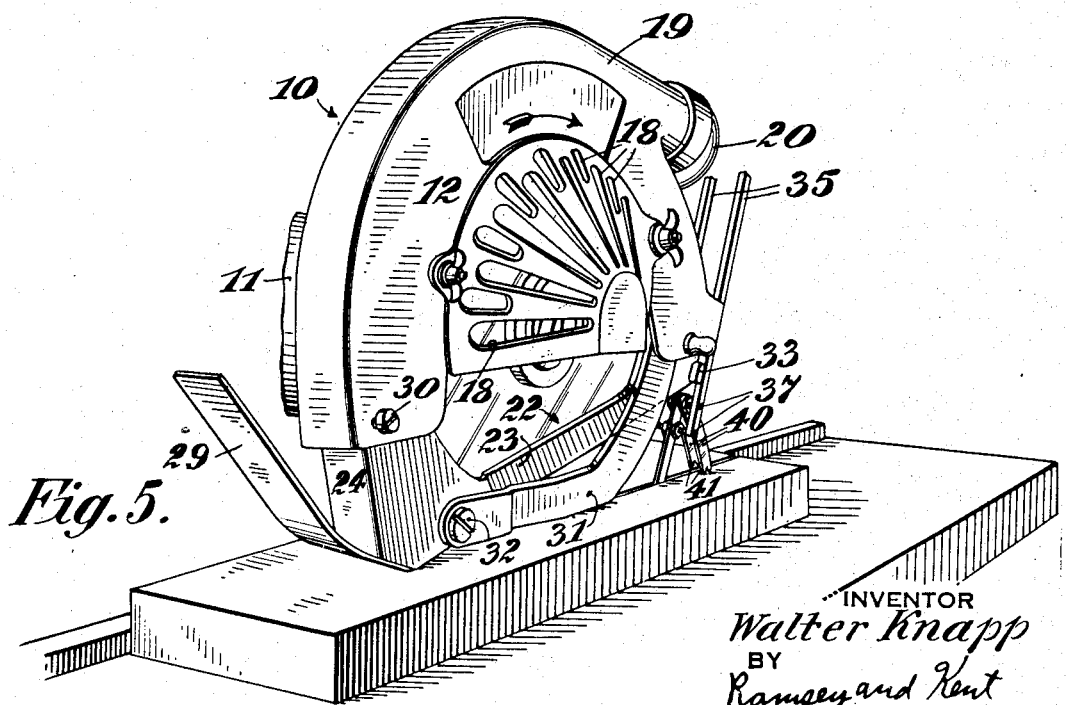
Fig. 5 is a perspective of the device with a piece of work material inserted.

The main guard body 10 has a front flange 12 and a rear flange 13, and is adjustably mounted upon the motor housing as clearly shown in Figures 3 and 4. This adjustable connection includes a saddle 14 carried by the motor housing and a clamping bolt 15 which rides in an arcuate slot 16 formed in rear flange 13. In some cases it may be preferred to mount the guard rigidly upon the housing 11 but the adjustable mounting makes it possible to rotate the guard member to conform to various working positions or quickly remove it from the machine.

A removable cover plate 17 is secured to the front flange 12 and serves to protect the end of the shaft upon which the saw is mounted. This cover plate may be formed with radially disposed ventilating louvres 18 and the removability of this cover plate permits ready access to the end of the shaft for replacement of the cutter.

A dust nozzle 19 extends substantially tangentially from the upper rim of the guard, in the direction of rotation of the cutter and the discharge elbow 20 is secured to the outer end of nozzle 19 by any suitable means, such as thumb screw 21, and is angularly adjustable. The combination of centrifugal force and the air current created by the revolving cutter carries the dust particles so that they are discharged through the discharge nozzle, and by attaching a suitable piece of tubing to the outer end of the discharge elbow 20, the dust may be discharged at a distance from the machine. By making the discharge elbow 20 angularly adjustable, it is possible to discharge the dust in any desired direction and to compensate for different operating positions of the motor 11.

Attached to the lower end 5 of the main guard member 10 is a front guard 22. This front guard covers and protects the front end of the cutter toward which the work is fed, and comprises two side pieces 23 joined at the front by a closed wall 24 and at the rear with a closed wall 25. The parts 23, 24 and 25 form an integral structure of such size and shape that its ends can fit within the lower ends of the main body 10, and it is pivoted at the rear end of the main body on a suitable pivot 26. The front part of this guard member 22 slides vertically within the front end of the main body 10, and suitable means is used to provide a lower limit for this movement such as the lip 27 engaging the shoulder 28 on the inner side of the guard 10.

In the preferred construction this guard member 22 is automatically actuated by gravity to the lowered position shown in Figure 1 in which the front end of the guard falls below the pivot point 26. In order to permit the guard member to ride over a piece of work being fed to the cutter, the lower front end of the guard is provided with a guide 29, which extends at an upward angle and may be formed either homogeneous with the automatic guard member or in the form of a separate piece attached thereto. The latter construction makes a lighter structure, and permits replacement due to wear as well as the use of a material better suited for this portion of the structure.

In certain installations the parts may be so arranged that the front guard 22 cannot move automatically to closed position under the force of gravity and in this case an equivalent biasing means, such as springs, can be used to perform this function.

An important feature of the design of the front guard 22 is that the hinge point 26 is placed as near the working level as possible and as far away from the guide member 29 as possible. This reduces the amount of force required to raise the automatic guard when feeding the work to the cutter. A set screw 30 may be used to hold the front guard in fixed relation to the main guard when this is desirable.

In the preferred form of the invention additional guard means is provided to protect the lower sides of the cutter along the quadrant not covered by the main guard member 10 or the automatic guard 22. This side protection is afforded by a pair of side guards 31, one of which is pivoted on each of the outer sides of the front guard 22 at the point 32, adjacent the front end of the guard member 22. These side guards 31 are of generally arcuate shape having a flattened lower surface to conform to the work, and they ride between the sides of the automatic guard and the flanges of the main guard 10. The side guards normally fall to their lowered position under the influence of gravity and their lower movement is limited by engagement with the stop members 33 projecting laterally from the wall of the front guard 22 near the pivot 26.

The use of the automatic front guard 22 and the side guards 31 in combination with the main guard cover 10 affords protection for the entire periphery of the saw and the guard members 22 and 31 fall automatically to their lowered position under the influence of gravity. In the combination disclosed the entire weight of the combined automatic guards 22 and 31 is not lifted at the instant the work is fed under the guide part 29. Part of this weight is not lifted until after the material has passed almost to the center line of the cutter when the piece of work material engages the lower side of the side guards 31. This combination of parts provides a simple and rugged automatic guard without the use of counterweights or counterbalancing springs, and which is easy to operate and which therefore does not materially impede the normal operation of the cutting machine.

An outstanding feature of this machine is the fact that the guards will ride upon and over the material when either the guard and its support are moved over the material or when the material is passed under the machine, and in both circumstances the motion may be in either direction. This guard will also operate at any angle in relation to the work up to 45 degrees.

The main body 10 is provided with a rear inclined seat 34 to which is attached an adjustable splitter and kick-back dog. This device is made up of two parallel supporting members 35 which are held in spaced relationship to each other by riding in slots 36 formed in the seat 34 and by means of two studs 37. The knife shaped splitter 38 is held in adjustable relation to the cutting line by means of opposed nuts 39 mounted on the studs 37. This splitter engages in the saw slot and prevents the work material from binding on the sides of the cutter.

This invention also provides for a pivoted kick-back dog to engage the work and prevent reverse movement of the work being fed past the cutter. In the form illustrated, a pair of kick-back dogs 40 are pivoted to one of the studs 37 and the lower end of each of these dogs is provided with teeth 41 for engagement with the work.

The support members 35, which carry the splitter and kick-back dogs, are vertically adjustable to accommodate work material of different thicknesses.

While certain of the devices described above may be used independently of each other, it will be evident to one skilled in the art that these features cooperate to form an improved safety device which protects the operator against all of the major hazards incident to the operation of this type of cutting machine. The safety device can be used to protect a saw, abrasive wheel, dado head, or any rotary cutter.

I claim:

1. In combination, a machine having a rotary cutter, an arcuate main guard of channel-shaped cross section attached to a part of the machine and covering part of the periphery of the cutter, a front guard pivoted to the main guard at a point to the rear of the axis of the cutter, the forward part of the front guard being arranged to telescope within the main guard and being biased by gravity in a direction away from the axis of the rotary cutter to a lowered position covering the periphery of the cutter between the main guard and the feed plane on the feed side of the cutter, the lower edge of the front guard sloping upwardly toward its pivoted end when the guard is in lowered position, whereby the front guard can be elevated by work material approaching the cutter from either direction, a side guard pivoted to each side of the front guard near the forward part of the front guard and extending rearwardly and upwardly, the side guards being biased by gravity to a lowered position covering the lower sides of the cutter.

2. In combination, a machine having a rotary cutter, an arcuate main guard of channel-shaped cross section attached to a part of the machine and covering part of the cutter, a front guard pivoted to the main guard at a point to the rear of the axis of the cutter, the forward end of the front guard being formed with an upwardly and forwardly extending guide surface which causes the front guard to move upwardly when work material approaches the cutter from the front, two side guards, each side guard having one of its ends pivoted to the front guard near the forward end of the front guard, each side guard being formed with an upwardly and rearwardly extending guide surface, said rearwardly extending guide surfaces causing the side guards to move upwardly when work material approaches the cutter from the rear.

3. In combination, a machine having a rotary cutter, an arcuate main guard of channel-shaped cross section attached to a part of the machine and covering the upper part of the cutter, a front guard pivoted to the main guard at a point to the rear of the axis of the cutter, the front guard being biased downwardly, stop means for limiting downward movement of the front guard, the forward end of the front guard being formed with an upwardly and forwardly extending guide surface which causes the front guard to move upwardly when work material approaches the cutter from the front, two side-guards, the side guards being independent of each other and each side guard having one of its ends pivoted to the front guard near the forward end of the front guard, the side guards being biased downwardly, stop means for limiting the downward movement of the side guards, each side guard being formed with an upwardly and rearwardly extending guide surface, said rearwardly extending guide surfaces causing the side guards to move upwardly when work material approaches the cutter from the rear.

4. In combination, a machine having a rotary cutter, an arcuate main guard of channel-shaped cross section attached to a part of the machine and covering part of the cutter, a front guard pivoted to the main guard at a point to the rear of the axis of the cutter, the forward end of the front guard being formed with an upwardly and forwardly extending guide surface which causes the front guard to move upwardly when work material approaches the cutter from the front, the lower edge of the front guard sloping upwardly toward its pivoted end when the guard is in lowered position thereby permitting elevation of the front guard when work material approaches the cutter from the rear, two side guards, each side guard having one of its ends pivoted to the front guard near the forward end of the front guard, each side guard being formed with an upwardly and rearwardly extending guide surface, said rearwardly extending guide surfaces causing the side guards to move upwardly when work material approaches the cutter from the rear.

5. In combination, a machine having a rotary cutter, an arcuate main guard of channel-shaped cross section attached to a part of the machine and covering the upper part of the cutter, a front guard pivoted to the main guard at a point to the rear of the axis of the cutter, the front guard being biased downwardly, stop means for limiting downward movement of the front guard, the forward end of the front guard being formed with an upwardly and forwardly extending guide surface which causes the front guard to move upwardly when work material approaches the cutter from the front, the lower edge of the front guard sloping upwardly toward its pivoted end when the guard is in lowered position thereby permitting elevation of the front guard when work material approaches the cutter from the rear, two side guards, the side guards being independent of each other and each side guard having one of its ends pivoted to the front guard near the forward end of the front guard, the side guards being biased downwardly, stop means for limiting the downward movement of the side guards, each side guard being formed with an upwardly and rearwardly extending guide surface, said rearwardly extending guide surfaces causing the side guards to move upwardly when work material approaches the cutter from the rear.

WALTER KNAPP.